United States Patent [19]

Suda et al.

[11] Patent Number: 5,053,803
[45] Date of Patent: Oct. 1, 1991

[54] INFORMATION DISPLAY APPARATUS FOR CAMERA

[75] Inventors: Yasuo Suda; Kenji Ito; Keiji Ohtaka; Kenji Suzuki, all of Yokohama, Japan

[73] Assignee: Canon Kabushiki Kaisha, Tokyo, Japan

[21] Appl. No.: 480,671

[22] Filed: Feb. 15, 1990

[51] Int. Cl.$^5$ .............................................. G03B 17/18
[52] U.S. Cl. ...................................... 354/466; 354/471
[58] Field of Search ............... 354/465, 466, 471, 472, 354/473, 474, 475

[56] References Cited

U.S. PATENT DOCUMENTS

| | | | |
|---|---|---|---|
| 4,294,529 | 10/1981 | Sato et al. | 354/475 |
| 4,359,275 | 11/1982 | Hasegawa | 354/475 |
| 4,374,612 | 2/1983 | Matsumura et al. | 354/475 |
| 4,949,118 | 8/1990 | Yamamoto et al. | 354/475 |

FOREIGN PATENT DOCUMENTS

| | | |
|---|---|---|
| 53-32048 | 3/1978 | Japan. |
| 62-47612 | 3/1987 | Japan. |
| 1277225 | 11/1989 | Japan. |

*Primary Examiner*—Russell E. Adams, Jr.
*Attorney, Agent, or Firm*—Fitzpatrick, Cella, Harper & Scinto

[57] ABSTRACT

A camera body includes a movable main mirror for reflecting a light beam emerging from an objective lens, an optical element arranged along a reflection optical path of the movable main mirror and near a predetermined imaging plane of the objective lens, and having a plurality of micro refracting elements forming a display character, an eyepiece, a prism for deflecting the reflection optical path toward the eyepiece, and an illumination source, arranged in front of the prism, for causing the movable main mirror to reflect an illumination light beam to illuminate the display character.

6 Claims, 5 Drawing Sheets

INFORMATION DISPLAY APPARATUS FOR CAMERA

BACKGROUND OF THE INVENTION

1. Field of the Invention

The present invention relates to a display character observation apparatus suitable for a still camera, a video camera, or the like and, more particularly, to a display character observation apparatus which displays a display character of a distance measurement range, a photometric range, or the like at an arbitrary position in a photographing frame, so that an object image formed by a photographing lens and the display character can be simultaneously observed through a finder system.

2. Related Background Art

In a conventional single-lens reflex camera, or the like, an object image formed on a focusing screen formed by a photographing lens and a display character of a distance measurement range, a photometric range, or the like located on the focusing screen or at a position optically equivalent to that of the focusing screen are simultaneously observed through a finder system. As an example of displaying a distance measurement range, a proposal in which a liquid crystal display is arranged on a predetermined imaging plane in a camera body of a single-lens reflex camera is known (Japanese Patent Laid-Open No. 62-47612). However, this proposal results in a dark screen, and an increase in cost. Japanese Patent Laid-Open No. 53-32048 describes an arrangement wherein a holographic mark is formed on a flat plate arranged near a predetermined imaging plane in a camera body, and is illuminated with light propagating through the flat plate. In this case, the thickness of the flat plate tends to be increased.

In a finder system of a single-lens reflex camera, a condenser lens or a fresnel lens is arranged before or after a focusing screen, so that a light beam from an object image on the focusing screen is efficiently incident on an eyepiece of the finder system.

In general, the thickness of a fresnel lens can be decreased as compared to that of a condenser lens, and a finder system can be easily made compact.

For this reason, fresnel lenses are used in many finder systems. Therefore, a fresnel lens must be arranged so as not to interfere with a display.

Note that such an arrangement is disclosed in Japanese Patent Laid-Open No. 1-277225.

SUMMARY OF THE INVENTION

It is an object of the present invention to provide an apparatus which can clearly display information.

It is another object of the present invention to provide an apparatus which can display information to overlap an observation frame.

It is still another object of the present invention to provide an information display apparatus which can be assembled in a camera body without requiring a large space.

DETAILED DESCRIPTION OF THE PREFERRED EMBODIMENT

Figure 1:
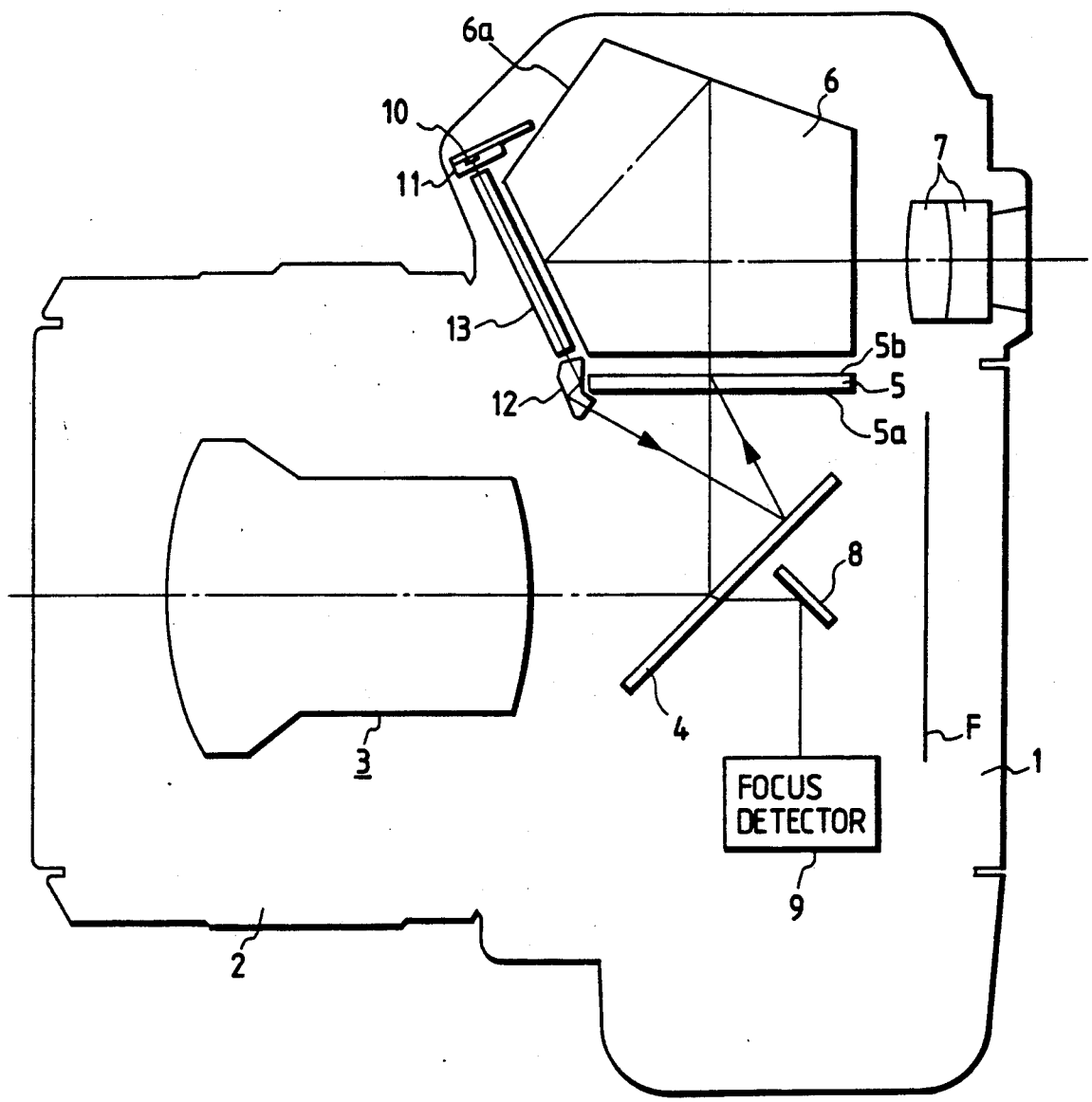
FIG. 1 is a schematic sectional view of an embodiment when the present invention is applied to a single-lens reflex camera.

FIG. 1 is a schematic sectional view of an embodiment when the present invention is applied to a single-lens reflex camera.

In FIG. 1, a camera body 1 includes a lens barrel 2 for holding a photographing lens 3 consisting of a plurality of elementary lenses to be movable in its axial direction. A movable half transparency mirror 4 allows some light components of a light beam from an object passing through the photographing lens 3 to pass therethrough, reflects the remaining light components, and guides them to a finder system. A movable sub mirror 8 is tiltably mounted on or independently swingably arranged on the movable half transparency mirror. The sub mirror 8 causes light components passing through the movable half mirror 4 to become incident on a focus detector 9 on the bottom portion of the camera. The camera body also includes a focusing screen 5, a pentagonal prism 6, and an eyepiece 7. These components constitute a finder system. The focus detector 9 can detect a focal point at a plurality of positions in the screen, as described in Ser. No. 266,804. Note that F designates a film.

Figure 2:
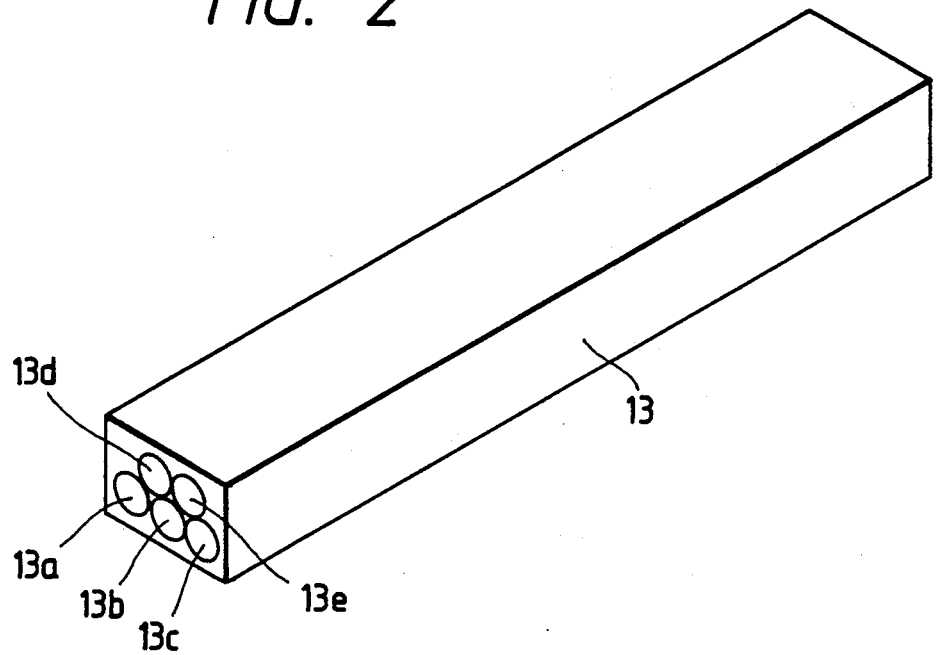
FIG. 2 is a perspective view for explaining a lens array shown in FIG. 1.

An illumination source 10 comprises a plurality of light-emitting diodes (10a to 10e) each having a light-emission peak wavelength of, e.g., 635 nm, and aligned in a direction perpendicular to the surface of the drawing. A package 11 incorporates these light-emitting diodes (10a to 10e). A projection lens block 12 has two reflection surfaces. A refractive index distribution type rod lens array 13 consists of five rod lenses 13a to 13e, as shown in, e.g., FIG. 2. The rod lens array 13 projects images of the five light-emitting diodes 10a to 10e onto positions near the incident surface of the projection lens block 12.

Figure 3:
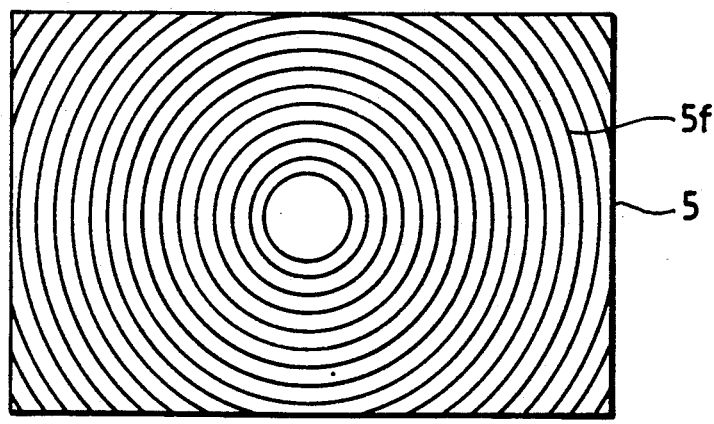
FIG. 3 is a view for explaining a fresnel lens shown in FIG. 1.
Figure 4:
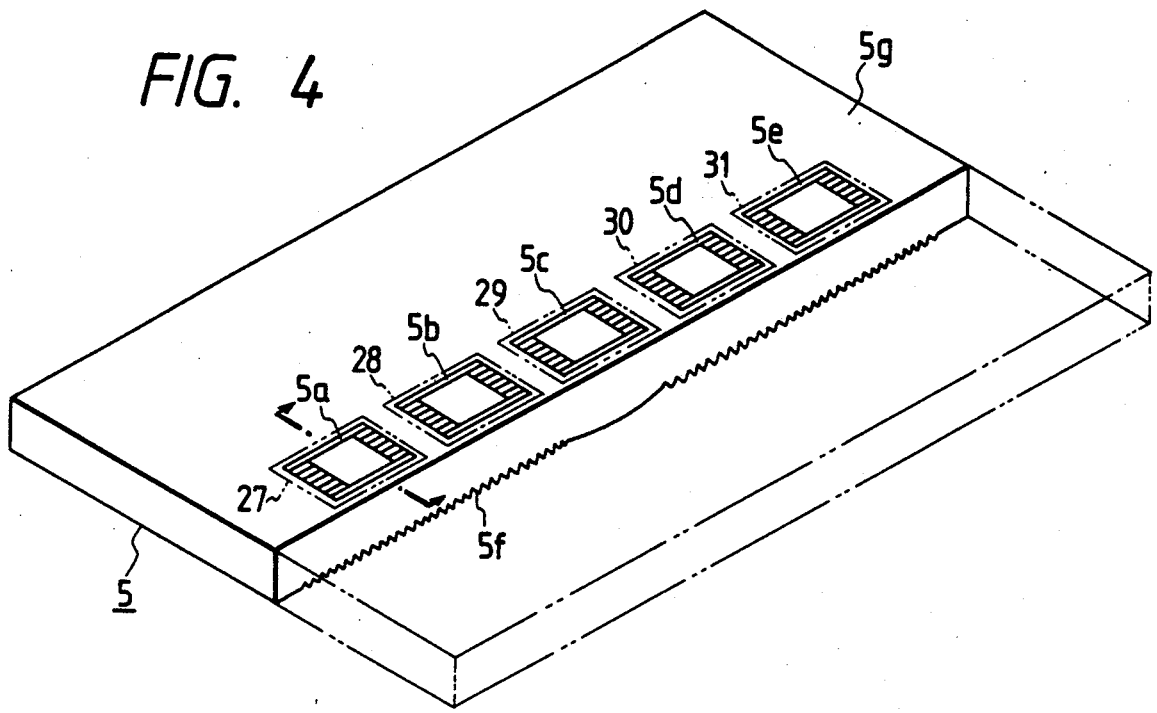
FIG. 4 is a perspective view for explaining a display shown in FIG. 1.

In this embodiment, a fresnel lens 5f shown in FIG. 3 is arranged on a light incident surface 5a side of the focusing screen 5, and a light diffusing surface 5g is formed on a light exit surface 5b side, as shown in FIG. 4. Five display characters 5a to 5e are arranged on the light exit surface 5b, as shown in FIG. 4. The display characters 5a to 5e respectively display distance measurement regions in the photographing frame, and are constituted by a large number of microprisms. In this case, the display characters 5a to 5e are arranged so that the ridgeline of each microprism constituting the display characters is substantially perpendicular to the tangential direction of the ridgeline of the fresnel lens 5f.

Thus, the display characters can efficiently guide illumination light (to be described later) toward the eyepiece by a refraction effect of the prisms, and can prevent ghost light emerging from the ridgeline of the fresnel lens from becoming incident on the eyepiece, thus assuring good observation of the display characters and an object image.

Figure 5:
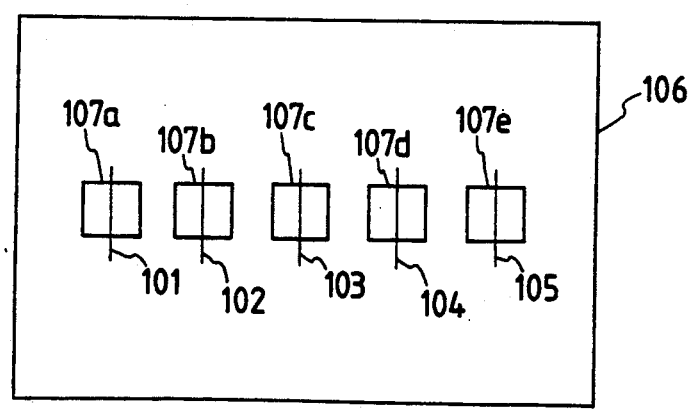
FIG. 5 is a view for explaining display characters in a photographing frame.

The focus detector 9 of this embodiment can measure a distance at a large number of positions in the photographing frame. For example, the detector can measure a distance in five regions 101 to 105 enclosed by lines in a photographing frame 106, as shown in FIG. 5. In FIG. 5, reference numerals 107a to 107e correspond to the display characters 5a to 5e representing distance measurement fields shown in FIG. 4.

In a method of illuminating the display characters 5a to 5e in this embodiment, light beams from the flashing LEDs of the illumination source 10 are guided onto and reflected by the movable half transparency mirror 4 through the lens array 13 and the projection lens block 12, so that the reflected light components illuminate a selected one of the display characters 5a to 5e on the focusing screen 5. The selected display character can be observed through the eyepiece 7 together with an object image formed on the focusing screen 5.

Figure 6:
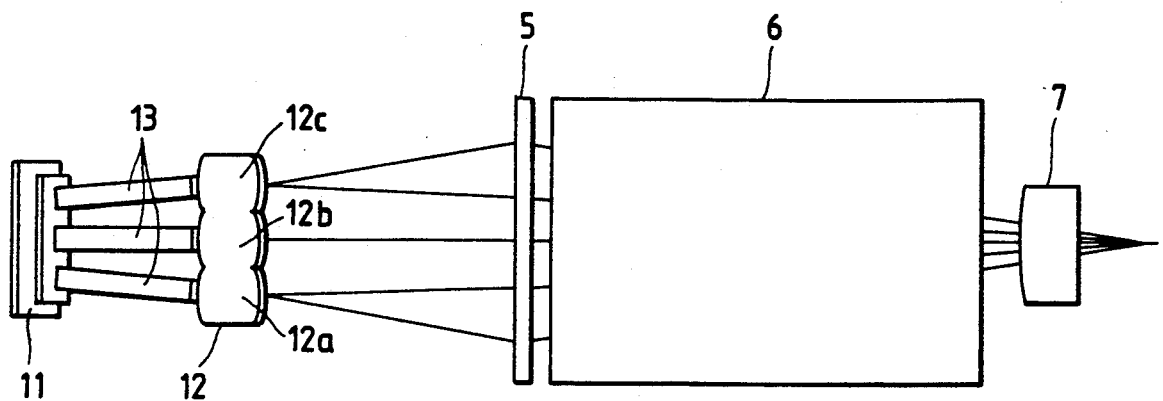
FIGS. 6 and 7 are views when a finder system and an illumination system shown in FIG. 1 are developed.
Figure 7:
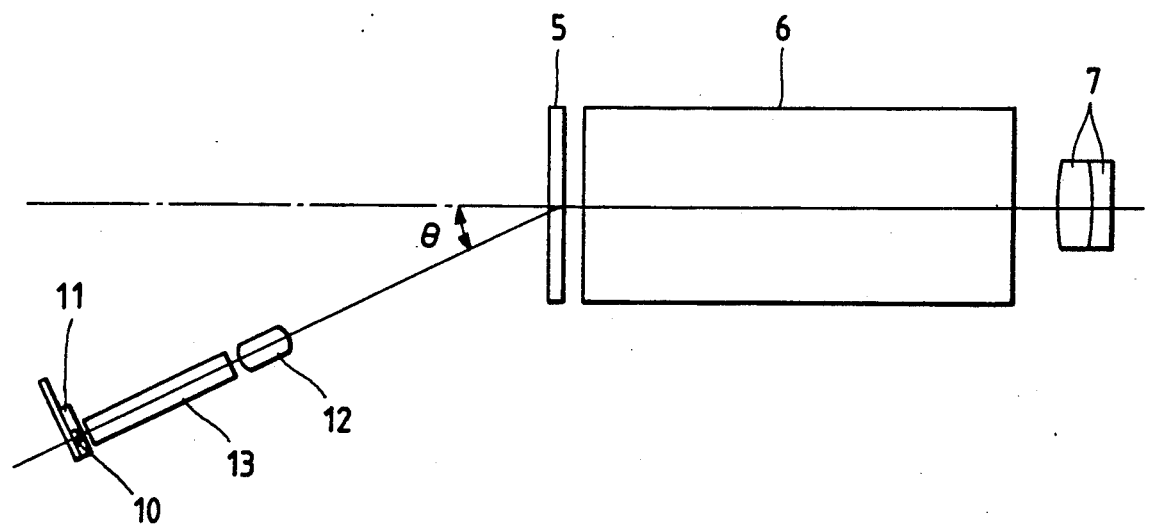
Figure 8:
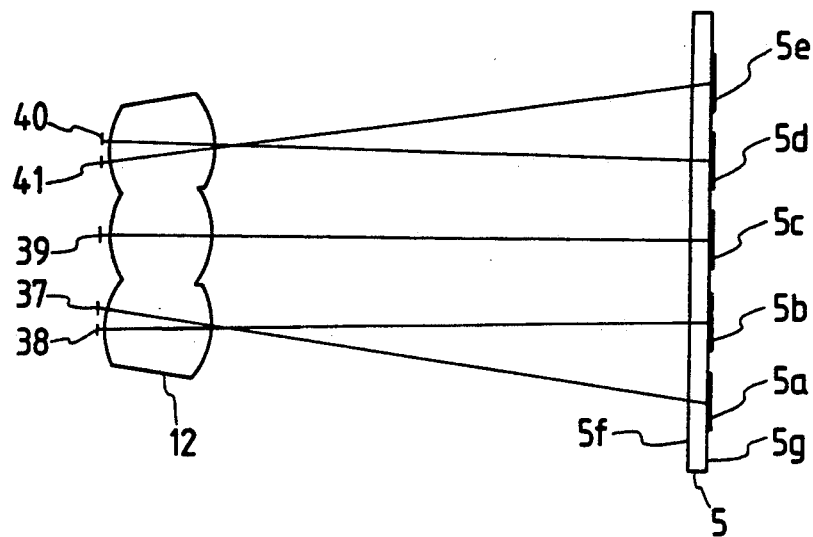
FIG. 8 is a partially enlarged view of FIG. 6.

FIGS. 6 and 7 are views showing the finder system and the illumination source shown in FIG. 1 which are developed along an optical path excluding reflection surfaces. FIG. 6 is a plan view, and FIG. 7 is a side view of FIG. 6. As shown in FIG. 6, the projection lens block 12 is constituted by three lens portions 12a, 12b, and 12c. The projection lens block 12 reflects light toward desired regions of the five display characters 5a to 5e on the focusing screen 5, as shown in detail in FIG. 8. The projection lens block 12 obliquely illuminates the focusing screen 5 at an angle $\theta$, as shown in FIG. 7. In FIG. 8, reference numerals 37 to 41 designate images of the light-emitting diodes 10a to 10e formed by the refractive index distribution type rod lenses 13a to 13e.

As described above, since the five display characters 5a to 5e on the focusing screen 5 are constituted by a large number of microprisms, illumination light components incident on the microprisms are refracted and deflected toward the eyepiece 7, thus allowing bright information display.

When one of the display characters 5a to 5e is selectively illuminated by the light-emitting diodes 10a to 10e and the projection lens block 12, a presently selected distance measurement field can be displayed in, e.g., red, and other fields can be displayed in black for a reason to be described later.

Figure 9:
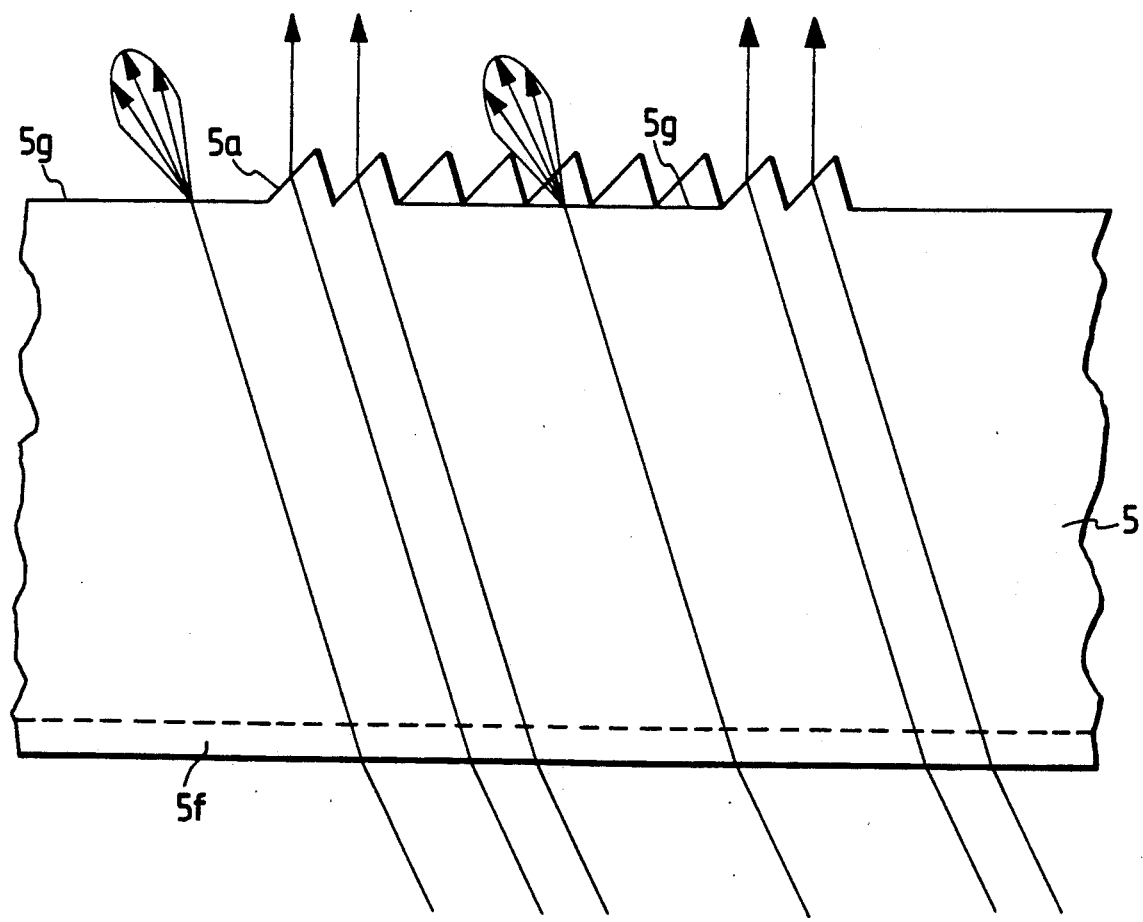
FIG. 9 is a partially enlarged view of FIG. 4.

FIG. 9 is an enlarged view showing a propagation state of a light beam with reference to the display character 5a on the focusing screen 5.

In FIG. 9, illumination light components propagating from a lower portion toward an upper portion of the projection lens block 12 propagate toward the display character 5a consisting of prisms and the light diffusing surface 5g while being deflected by the fresnel lens 5f toward the eyepiece 7 in a plane perpendicular to the surface of the drawing, and also being refracted in a direction along the surface of the drawing. Of these light components, light components incident on the display character 5a are refracted toward the eyepiece 7, i.e., in a direction parallel to the finder optical axis by a refraction effect of the prisms, and the display character 5a is observed while being colored by a light-emission wavelength of the light-emitting diode 10a. On the other hand, light components incident on the light diffusing surface 5g are diffused thereby. In this case, in the structure of the single-lens reflex camera shown in FIG. 1, since the incident angle $\theta$ is about 27° and almost corresponds to F1.0, most of the diffused light components are incident on a light absorption surface 6a of the pentagonal prism 6 and do not become incident on the eyepiece. As a result, these light components are not visually observed. A light amount of an illumination light beam is controlled in proportion to the brightness of an object image, thus eliminating ghost light caused by diffused light components.

The display characters 5a and 5e are arranged so that the ridgeline of each prism constituting the display characters is substantially perpendicular to the tangential direction of the ridgeline of the fresnel lens 5f. Thus, an illumination light beam is refracted by the ridgeline of the fresnel lens and is prevented from appearing around the display characters as ghost light.

Note that in this embodiment, the display characters serve as distance measurement ranges but may be photometric ranges.

The concentrical fresnel lens is employed. However, a fresnel lens asymmetrical about an axis of rotation may be employed.

According to the embodiment described above, in a finder system using a fresnel lens, when a display character constituted by a plurality of prisms is illuminated by an illumination means and is observed together with an object image formed by a photographing lens, since the display character and the fresnel lens are arranged as described above, ghost light emerging from the ridgeline of the fresnel lens can be prevented from becoming incident on an eyepiece. Thus, a display character observation apparatus which can assure high-quality display can be realized.

What is claimed is:

1. An information observation apparatus in which a fresnel lens is arranged near a predetermined imaging plane on which an object image is formed by an objective lens, an optical element having a display character constituted by a plurality of microprisms is arranged near said fresnel lens, and said display character is illuminated by illumination means and is observed together with the object image formed by said objective lens, wherein ridgelines of said microprisms constituting said display character are arranged to be substantially perpendicular to a tangential direction of a ridgeline of said fresnel lens.

2. An apparatus according to claim 1, wherein said optical element has display characters at a plurality of different positions.

3. An apparatus according to claim 2, wherein said illumination means illuminates said plurality of display characters selectively.

4. A camera body comprising:
   a movable main mirror for reflecting a light beam emerging from an objective lens;
   an optical element arranged along a reflection optical path of said movable main mirror and near a predetermined imaging plane of said objective lens, and having a plurality of micro refracting elements forming a display character;
   an eyepiece;
   a prism for deflecting the reflection optical path toward said eyepiece; and
   illumination means, arranged in front of said prism, for causing said movable main mirror to reflect an illumination light beam to illuminate said display character.

5. A camera body according to claim 4, wherein said optical element has display characters at a plurality of different positions, and said illuminat' means selectively illuminates one of said display c' acters.

6. A camera body according to claim 4, further comprising:
- a focus detector for detecting a focusing state of said objective lens; and
- a sub mirror for deflecting a light beam passing through said movable main mirror toward said focus detector, wherein a point where the center of a light beam illuminating said display character is reflected by said movable main mirror is separated from a point where the center of the light beam passing through said objective lens is reflected by said movable main mirror.

* * * * *

UNITED STATES PATENT AND TRADEMARK OFFICE
CERTIFICATE OF CORRECTION

PATENT NO. : 5,053,803

DATED : October 1, 1991

INVENTOR(S) : Yasuo SUDA ET AL.

It is certified that error appears in the above-identified patent and that said Letters Patent is hereby corrected as shown below:

Title page, item
AT [56] References Cited
FOREIGN PATENT DOCUMENTS

"1277225 11\1989 Japan" should read
--1-277225 11\1989 Japan--.

Signed and Sealed this

Ninth Day of November, 1993

Attest:

BRUCE LEHMAN

Attesting Officer

Commissioner of Patents and Trademarks